UNITED STATES PATENT OFFICE.

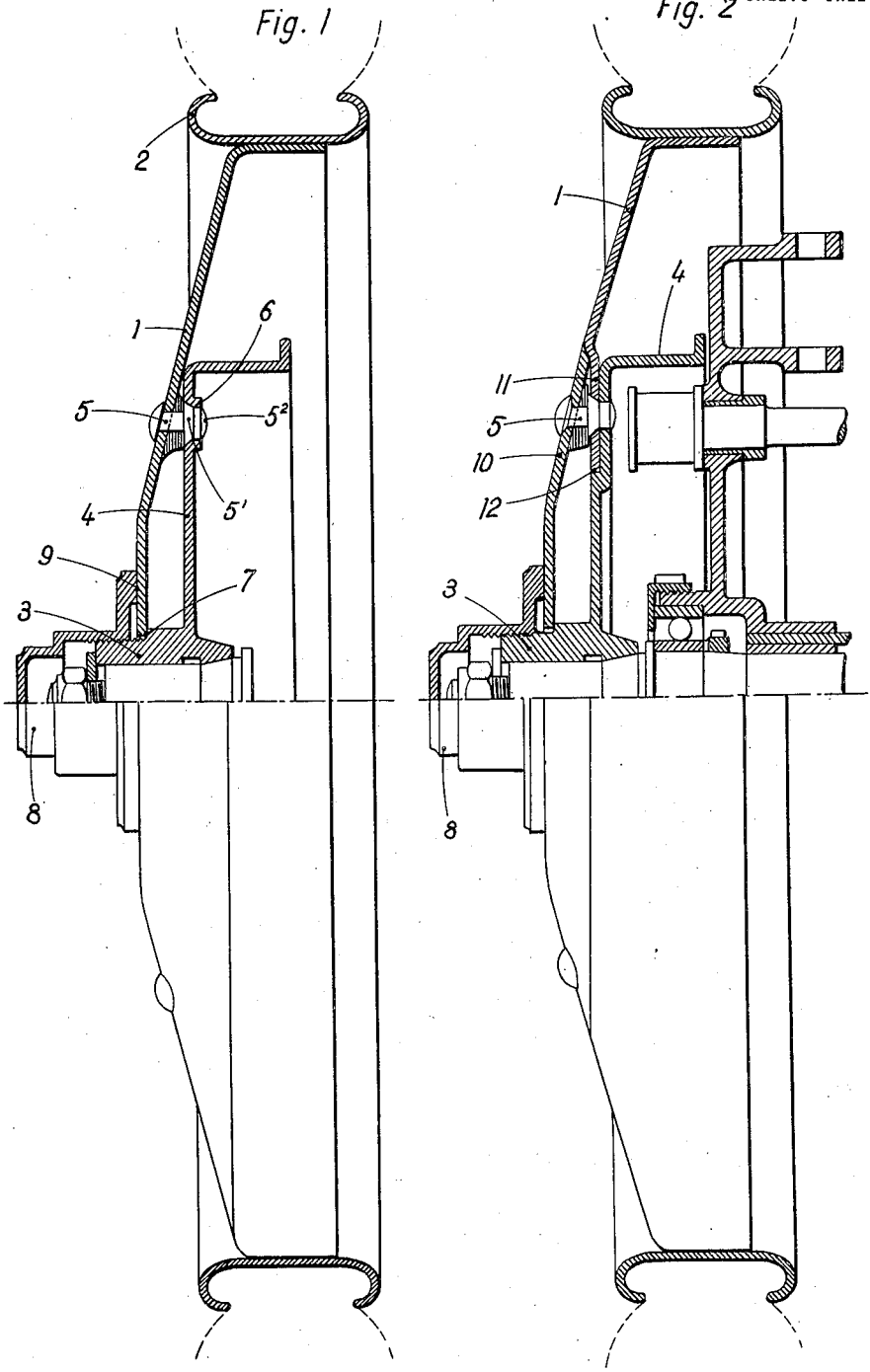

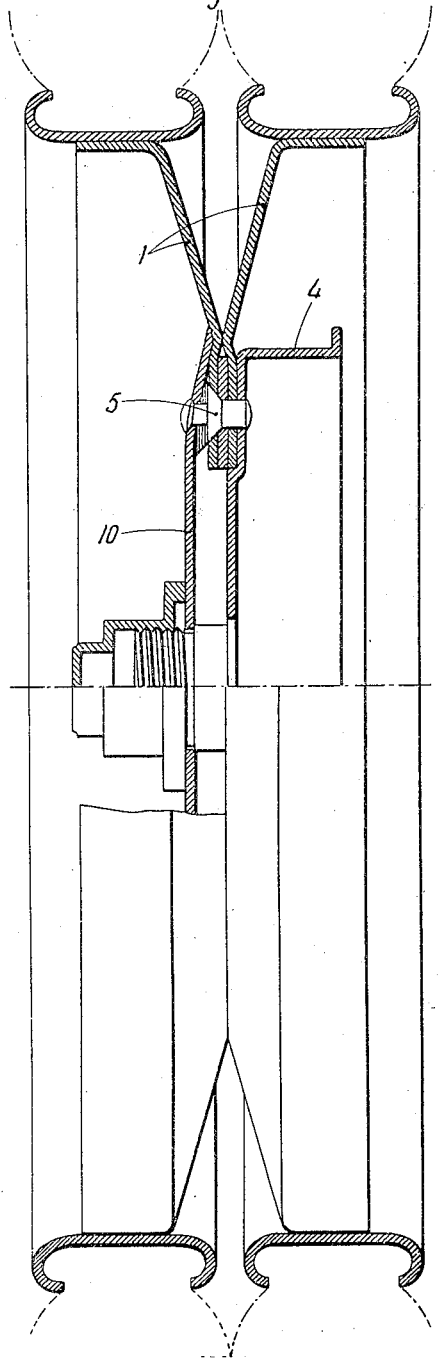

PIERRE L. LEISSE, OF BOULOGNE, FRANCE, ASSIGNOR TO LOUIS RENAULT, OF BILLANCOURT, FRANCE.

SHEET-METAL WHEEL.

1,385,628.  Specification of Letters Patent.  Patented July 26, 1921.

Application filed February 25, 1920. Serial No. 361,191.

*To all whom it may concern:*

Be it known that I, PIERRE L. LEISSE, citizen of the French Republic, residing at Boulogne, Department of the Seine, in France, and having P. O. address 12 Rue Alfred-Laurent, in the said city, have invented certain new and useful Improvements in or Relating to Sheet-Metal Wheels; and I do hereby declare the following to be a full, clear, and exact description of the invention, such as will enable others skilled in the art to which it appertains to make and use the same.

The invention relates to stamped sheet metal wheels for vehicles and more especially to an arrangement for clamping or locking the wheel on a false hub in a simple and rapid manner. The arrangement forming the subject of the invention consists essentially in the use of a cap or nut which screws onto the end of the false hub and presses against the sheet metal plate of the wheel or against an auxiliary sheet metal plate connected therewith. This sheet metal plate which has a certain elasticity is slightly and temporarily deformed under the action of the pressure exerted by the nut, and prevents by its pressure on the nut in tending to return to its normal position, any loosening or slackening of the cap or nut. An effective locking of the securing nut or cap is thus obtained without the necessity of utilizing the usual arrangements of lock nuts indispensable for removable wheels.

In order that the invention may be clearly understood, reference is made to the accompanying drawing whereon:

Figure 1 is a vertical cross section through the axis of a stamped sheet metal wheel provided with a locking arrangement in accordance with the present invention.

Fig. 2 is a vertical section of the same arrangement applied to a stamped sheet metal wheel having a large central opening.

Fig. 3 is a vertical cross section of a twin wheel of the type shown in Fig. 2 and provided with a locking arrangement also in accordance with the present invention.

In the form shown in Fig. 1, 1 represents a stamped sheet metal wheel of slightly conical form, carrying or provided with a felly 2. The sheet metal wheel 1 is provided with a central opening so as to permit the wheel passing over the false hub 3. The latter is rigid with a disk 4 which, in the example shown, carries the brake drum.

A suitable number of driving studs 5 are riveted to the supporting annulus 1 concentrically arranged with the axis of the wheel, these studs entering holes 6 provided in the brake drum 4. The studs or stud-bolts 5 are preferably of the form shown in Fig. 1 in which the rivet is spread as at 5' to form a conical disk which engages a correspondingly shaped opening in the brake drum. The studs or stud-bolts 5 are formed with cylindrical ends $5^2$ which act as guides. The inner face of the plate 1 adjacent the central opening therein abuts against a shoulder 7 on the false hub. A securing nut or cap 8 screws onto the end of the false hub so that the undercut face 9 of the nut or cap presses on the adjacent face of the wheel plate 1. On screwing on the nut or cap 8 pressure is exerted at the face 9 of the nut or cap on the plate 1 which is thereby slightly deformed, consequent on the elasticity of the said plate and the resulting reaction of the plate against the face 9 of the nut or cap 8 prevents loosening or slackening of the said nut or cap when the vehicle is running. In certain constructions the use of the shoulder 7 acting as an abutment for the inner face of the plate 1 may be dispensed with. In this case the position of the securing nut or cap is then determined solely by its fastening or locking means and by the elasticity of the sheet metal plate 1.

Fig. 2 represents a stamped sheet metal wheel having a large central opening as described in the specification of my application for Letters Patent Serial No. 361,190 filed Feb. 25, 1920.

The wheel 1 in this construction is not fixed on the brake drum by bolts and nuts as usual. The connection between the drum and the wheel is effected by means of an additional disk 10 mounted on the end of the false hub 3. The disk 10 is provided with driving studs or stud-bolts 5 riveted thereto and adapted to engage in holes in the wheel disk 1 and in the brake drum 4, the said holes being coincident in the three members when assembling the parts of the wheel. The disk 1 adjacent the central opening is formed with a flat portion 11 arranged perpendicular to the axis of the wheel which is applied against the correspondingly disposed face of the brake drum 4, and is supported at its inner peripheral edge on a shoulder 12 formed on the sheet metal plate of the brake drum. The additional or auxiliary disk 10 allows of the rigid connection of the plate 10 with the brake drum 4, and in consequence of its elasticity it acts in the manner hereinbefore described to prevent any loosening or slackening of the securing nut or cap 8.

Fig. 3 shows a twin wheel formed of two stamped sheet metal plates placed side by side and each having a large central opening. These wheels are, as shown in the arrangement in Fig. 2, rigidly connected with the brake drum 4 by means of studs or stud-bolts 5 carried by an auxiliary sheet metal plate or disk 10.

The invention is therefore characterized by the suppression of any auxiliary bolting arrangement in a stamped sheet metal wheel. The securing cap or nut screws onto the end of the false hub and by the pressure exerted by the said cap or nut on the adjacent part of the sheet metal plate, slightly and temporarily deforms the said plate, which, intending to return to its normal position by virtue of its elasticity, prevents loosening or slackening of the nut or cap.

The locking or fastening arrangement may be applied to ordinary stamped sheet metal wheels, and to wheels of the type having a large central opening. In the latter form of wheel an auxiliary or additional sheet metal plate or disk serves to effect rigid connection of the wheel and the disk or the brake drum which supports it, and at the same time, prevents by virtue of its elasticity the unlocking or slackening of the cap or nut.

Claims:
1. In a sheet metal wheel of the disk type, the combination of a hub supporting a brake drum or the like, a central opening formed in the web of said wheel, means connecting the web of the wheel with said brake drum or the like at a point removed from the central opening, and a cap or nut carried by said hub for clamping the portion of said wheel adjacent the central opening thereof to the hub, whereby the portion of the web of the wheel between the brake drum connection and the center thereof will be forced inwardly and flexed and a resilient connection produced.

2. In a sheet metal wheel of the disk type, the combination of a hub provided with a radial flange supporting a brake drum or the like, an enlarged central opening formed in the web of said wheel, an auxiliary cupped plate or disk encircling said hub adapted to overlap and partly close the central opening in said web, means connecting the web of the wheel with the auxiliary disk and radial flange of said hub, and a cap or nut carried by the hub for clamping the wheel and its auxiliary cupped plate or disk to said hub, whereby the auxiliary plate or disk will be bent inwardly from its point of connection with the web of the wheel and radial flange of the hub and thereby flexed and a resilient connection produced.

In testimony whereof I affix my signature, in presence of two witnesses.

PIERRE L. LEISSE.

Witnesses:
 LOUIS JORRE,
 EMILE KLOKE.